United States Patent [19]

König

[11] 3,749,857

[45] July 31, 1973

[54] CABLE TESTING DEVICE FOR LONG-DISTANCE CABLES, PARTICULARLY FOR OCCUPIED CABLES

[75] Inventor: Theodor König, Hagen, Germany

[73] Assignee: Walter Rose KG, Hagen, Germany

[22] Filed: Oct. 27, 1971

[21] Appl. No.: 192,924

[30] Foreign Application Priority Data

Oct. 28, 1970 Germany .................. P 20 52 987.7

[52] U.S. Cl. ............................ 179/175.3, 324/62 R

[51] Int. Cl. ............................................. H04b 3/46

[58] Field of Search .................... 179/175.3; 324/66, 324/62 R

[56] References Cited

UNITED STATES PATENTS

| | | | |
|---|---|---|---|
| 3,401,238 | 9/1968 | Williams et al. | 179/175.3 |
| 3,284,707 | 11/1966 | Clinton | 324/62 R |
| 3,156,909 | 11/1964 | Werk | 179/1 MN |
| 3,517,306 | 6/1970 | Anderson et al. | 179/175.3 |
| 3,424,874 | 1/1969 | Young | 179/175.3 |

*Primary Examiner*—Kathleen H. Claffy
*Assistant Examiner*—Douglas W. Olms
*Attorney*—George H. Spencer et al.

[57] ABSTRACT

A cable testing device including an oscillator designed to operate at a constant frequency and arranged to be selectively interconnected to one end of pairs of conductors in a long distance telephone cable through a transformer. Optical and/or acoustic signal generators are connected to windings on the transformer and to the pairs of conductors at their other ends at the opposite end of the cable. The signal generators permit resistance values of a known pair of conductors to be compared to resistance values of conductors tested one by one in conjunction with a return conductor of known value. These signal generators can be electrical meters or may involve a switching stage which is associated with the transformer to switch a wireless signal generator or a summing device, such as a multivibrator.

17 Claims, 5 Drawing Figures

CABLE TESTING DEVICE FOR LONG-DISTANCE CABLES, PARTICULARLY FOR OCCUPIED CABLES

BACKGROUND OF THE INVENTION

This invention relates to a cable testing device for long distance cables, particularly for occupied cables and more particularly for identifying the "*b*" conductors of a long distance cable.

For a telephone connection a line of two conductors is needed, one being termed "*a* conductor" the other "*b* conductor." The "*b* conductor" serves as a return circuit of the feed current, and is connected to ground until the "*b* conductor," by means of the cradle switch, is switched on to the selecting mechanism when the receiver is lifted off the cradle.

A known testing device for testing cables for interruptions, mixups, short circuits between conductors, and short circuits to ground with the aid of a summing device connected to one end of the cable, includes a multivibrator and a talk-listen set at each cable end for connection to a free pair of conductors which serve as the talk line during the test. In this device a test which does not interfere with the long distance operation of the cable is performed using a free pair of conductors in a known phantom connection, the conductors serving respectively as the return line for the conductor being tested and as the talk line. The output of the summing device is connected to this free pair of conductors. Moreover, a switching transistor is provided whose circuit serves to switch the summing device on and off, the control circuit being connected with its one terminal to the point of symmetry of the phantom circuit on the side of the summing device and its other terminal serving as a connection to the conductor to be tested. The control circuit of this switching transistor is designed and dimensioned in a known manner so that the switching transistor switches in dependence on the resistance of the conductor to be tested.

With such a cable testing device, as well as with all other known cable testing devices, there exists the drawback, however, that it is not possible to dertermine the identity of occupied "*b*" conductors, because all of the "*b*" conductors of a long distance cable are connected to ground and are thus bridged.

Since circuit breakers are further provided in the abovedescribed testing device and these breakers switch off when the operating voltage of the test instrument is exceeded, this known testing device cannot be used when the voltage drop in the cable section to be tested exceeds the operating voltage of the device.

SUMMARY OF THE INVENTION

It is therefore an object of the present invention to provide an arrangement for testing occupied cable conductors one by one, which arrangement is independent of the voltage drop present in the cable section being tested and which also permits identification of occupied "*b*" conductors of a long distance cable.

This is accomplished, according to the present invention, by a resistance comparison measuring device consisting of an oscillator which is connected to one end of a pair of conductors on the generator side to the primary winding of a transformer and which oscillates at a constant frequency that lies below the lower listening threshold of the telephone device. In addition, visible and/or audible signal generators are connected to the secondary winding of the transformer as well as to the other end or user side of the pair of conductors being tested at the output side. These signal generators are set to the resistance of a readily identified pair of conductors in the long distance cable. The signal generators may be current measuring devices.

As a result when the conductor being tested is identified, the same current flows as during the testing of a readily identified pair of conductors.

If, however, for example, the wrong "*b*" conductor has been connected at the user side, the resistance is now greater, and thus the current lower, than for the readily identified pair of conductors.

The long distance system is not interfered with by this type of testing device because the frequency of the alternating current, of preferably about 185 Hz which is produced by the oscillator, lies below the lower listening threshold of the communications system. Conversely, and for the same reason, the signal generators of the testing device cannot be influenced by the communications system.

Also the device is advantageous in testing longer cable sections in which, due to their higher resistance, the current flowing therethrough is very small so that previously it could be measured only with extremely sensitive, complicated and expensive current measuring devices. According to a further advantageous and inventive feature of the above-described testing arrangement this is avoided by the connection, at the secondary winding of the transformer and in parallel therewith, of a voltmeter, together with an amplifier with another voltmeter which are connected at the user side of the cable pair in parallel with an electrical resistor.

When the connection at the generator and at the user side coincides, the same voltage is measured as for the readily identified pair of conductors of the long distance cable. If there is no coincidence, the voltmeters indicate a higher voltage than before because with increasing resistance the voltage also increases.

In another embodiment of the invention an oscillator is provided which oscillates only when an associated resistance is above a preselected value. A potentiometer is connected in series with the secondary winding of the transformer, as is the conductor to be tested, the maximum resistance of the potentiometer, on the one hand, being equal to the preselected attenuation resistance of the oscillator and, on the other hand, being less than the total resistance of the conductor being tested and of the return line when the conductor being tested is not properly connected within the circuit. In addition there is a further winding associated with the primary winding of the transformer and to which a switching stage is connected to influence the transformer and whose circuit switches a wireless signal generator. At the user side the conductor being tested and the free conductor are bridged and a wireless signal receiver is provided.

This embodiment of the invention permits the testing, with relatively simple circuit elements, of, for example, an approximately 10 km long cable section if the oscillator is dependably attenuated at a resistance of about 2 kilohm.

In order for a signal to be generated when the connection coincides at the generator and user sides, the switching stage is designed in such a manner that it interrupts the circuit of the signal generator when it is influenced by the oscillator. Also the winding of the transformer which is connected to the switching stage has a higher number of turns than the primary winding which is connected to the oscillator. Thus it is possible to dependably switch the switching stage even when the alternating current produced by the oscillator has lower voltages.

A preferred embodiment of the above-mentioned switching stage, which also switches at low voltages, includes a rectifier, two series-connected transistors in emitter connection, two capacitors, four ohmic resistors, a reed relay and a diode in the switching stage for switching off the signal generator when the oscillator is oscillating and switching on the signal generator when the oscillator is attenuated. With this arrangement a switching stage is obtained which switches with a delay of, for example, one third of a second so that erroneous connections of the signal generator due to capacitor charges during testing resulting from a contact with different voltage potentials are dependably eliminated.

A preferred embodiment of the above-mentioned oscillator includes an oscillator which is designed according to the phase shift principle and has a transistor, six resistors, and four capacitors. The circuit arrangement comprising two resistors and two capacitors, the transistor and a feedback capacitor, generates oscillations at a frequency which lies below the the lower listening threshold of the telephone system. Three of the resistors serve to set the operating point of the transistor and its oscillating amplitude.

To further simplify the system and to reduce cost, yet another embodiment is provided in which the switching stage switches a summing device whose output is connected to the primary winding of an additional transformer. A headset is also connected to the primary winding so that it too is connected in parallel with the summing device. In a known manner, the return line for the conductor to be tested is provided by a free conductor pair in phantom connection, and another headset is connected to the conductor being tested at the user side as well as to the point of symmetry of the phantom circuit. A multivibrator is provided in a known manner to serve as the summing device. Through the use of the embodiment of the invention considered immediately above, the relatively complicated wireless signal generators and receivers are no longer necessary. As a protection against extraneous voltages, a capacitor is provided at each end of the conductor being tested and in series therewith.

In the above-described arrangement capacitors are connected in series with the two conductors of the pair of conductors serving as the return line on the generator side as well as on the user side. Thus it is possible for the first time to use an occupied pair of conductors of the long distance cable as the return line when identifying "*b*" conductors.

In order to be able to keep the operating point of the oscillator constant even when the voltage of the battery discharge current decreases, a resistor, a Zener diode and a capacitor are provided in the oscillator circuit so that a constant voltage supply for the oscillator is assured.

Such an arrangement on the generator side as well as on the user side is supplemented in an advantageous manner by a telephone set which comprises a microphone, a headset and three switches. One switch serves to open and close the microphone circuit. The second switch opens or closes, respectively, the ringing circuit. The third switch switches the test circuit on or off.

In this connection, an advantageous feature is characterized by a switch which is designed as a dual terminal switch which simultaneously closes, with its one terminal, the test circuit and, with the other terminal, it short-circuits the input of the test circuit with the center tap of the phantom circuit or conversely opens and closes these circuits.

To protect the microphone against an excess input current an additional resistor is provided in its circuit.

Finally, an advantageous embodiment of the above-described arrangement is composed of a known listening amplifier connected to the headset. With this feature the signals can still be dependably discerned when a transverse resistance of, for example, 10 ohms results in the long distance cable due to the influx of water, for example. Moreover, a noise killer rectifier is disposed in the circuit of the headset which dependably protects the headset against excess voltages which could result, for example, from extraneous induction.

DESCRIPTION OF THE PREFERRED EMBODIMENTS

Figure 1:
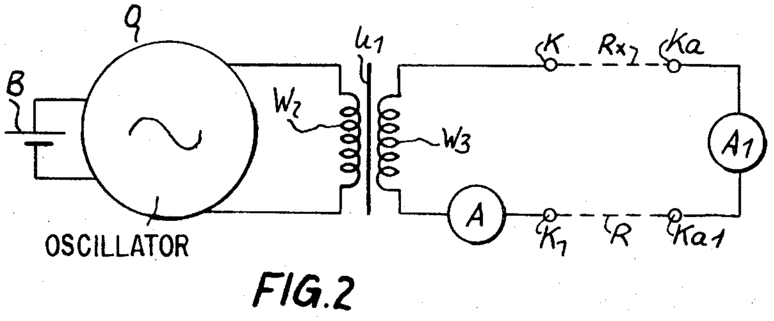
FIG. 1 is a circuit diagram of a cable testing device according to the invention without a talk-listen device.

The circuit of FIG. 1 includes an oscillator 0 which is fed, on the generator side, by a battery B with a voltage of, for example, 9V and which oscillates at a constant frequency of about 185 Hz, has its output connected to the primary winding $W_2$ of a transformer $U_1$. The secondary winding $W_3$ has output terminals K and $K_1$. Between terminal $K_1$ and the secondary winding $W_3$ an ammeter A is connected. A known and readily identified conductor of the long distance cable section to be tested is initially connected to terminal K and a free conductor R of this cable section is connected to terminal $K_1$. Thereafter the terminal contacts K*a* and K$a_1$ on the user side are bridged with an ammeter $A_1$ and the current is measured and recorded. Communication of the test personnel with each other can be accomplished, for example, via wireless telephones.

Subsequently, terminals K and K*a* are connected to the conductor R*x* being tested and the current is measured. The same current value as before should be the result of the measurement. If, however, less current than was measured for the unknown conductor is measured, the proper conclusion is that, for example, the conductor connected at the user side is different from the conductor connected at the generator side, resulting in a higher line resistance which produces the reduction in current.

Figure 2:
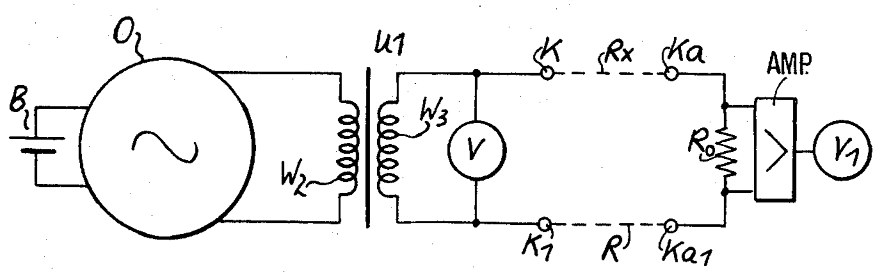
FIG. 2 is a circuit diagram of another embodiment of the cable testing device of the invention.

In the embodiment of the present invention which is illustrated in FIG. 2, voltmeters V and $V_1$ are provided instead of the ammeters, voltmeter $V_1$ being connected, via a known voltage amplifier Amp whose inputs are connected across a resistor $R_0$ connected between terminals K*a* and K$a_1$. Here a noncoincident connection on the generator and user sides is indicated by a higher voltage measurement than when the voltmeter is applied to the known pair of conductors.

Figure 3:
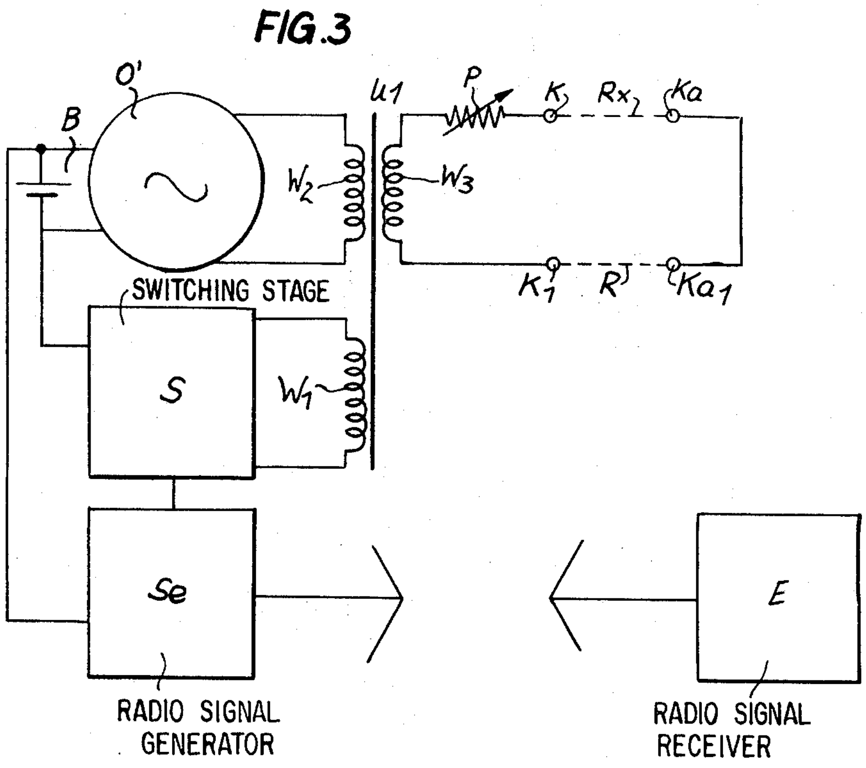
FIG. 3 is a circuit diagram of a further embodiment of the cable testing device according to the present invention.

In the embodiment shown in FIG. 3 an oscillator O' is provided which oscillates only when the resistance connected across transformer winding $W_3$ is above a preselected value of 2KΩ. A potentiometer P is connected between terminal K and one side of the secondary winding $W_3$ of transformer $U_1$. Terminals K*a* and K$a_1$ are bridged to have practically no resistance between them. Potentiometer P has a maximum resistance of 2KΩ and serves to bring the total resistance to 2KΩ when the known pair of conductors, whose total line resistance must be less than 2 kilohm if the conductors are properly connected, is connected. Oscillator O' has its output dependably damped with a tolerance of approximately ±5 to 10 ohms.

Transformer $U_1$ is provided with a further winding $W_1$ whose number of turns is preferably greater than that of winding $W_2$, resulting in a voltage converter. A switching stage S is connected to winding $W_1$ and arranged to close or open the circuit of a radio signal generator S*e*. On the user side, a radio signal receiver E is provided. With this arrangement signals are transmitted over long distances from signal generator S*e* and received by receiver E as long as different conductors are connected at the generator and user sides respectively, during the connection of conductors.

Figure 4:
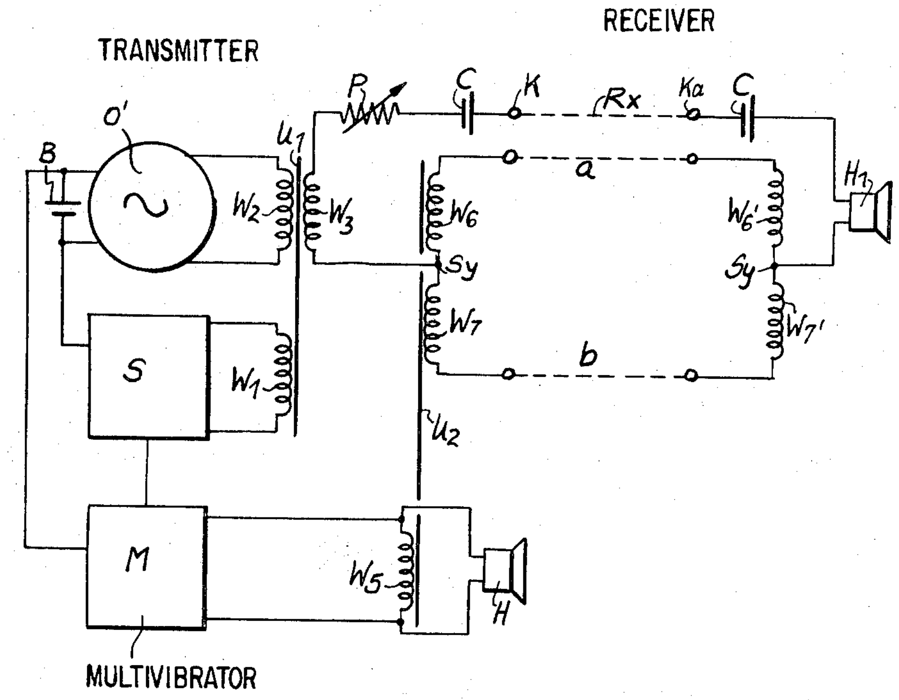
FIG. 4 is a circuit diagram of a testing device, according to the present invention, in which an unoccupied pair of conductors of the long distance cable is used as the return line.

In the embodiment disclosed by FIG. 4, the switching stage S is so designed that it actuates the radio signal generator when the oscillator O' is damped. A multivibrator M here serves as the signal generator and has its output connected to a winding $W_5$ of a second transformer $U_2$. An earphone headset H is connected across winding $W_5$. Moreover, an unoccupied pair of conductors a and b of the long distance cable, in a known phantom connection, serves as the return line. Transformer $U_2$ is provided with two additional windings $W_6$ and $W_7$ and winding $W_3$ of transformer $U_1$ is connected to the point of symmetry Sy between windings $W_6$ and $W_7$. On the user side another earphone headset $H_1$ has one side connected to the point of symmetry Sy between further windings $W_6$, and $W_7$, and its other side connected to the terminal K*a*. As a protection against extraneous voltages, capacitors C are provided.

Figure 5:
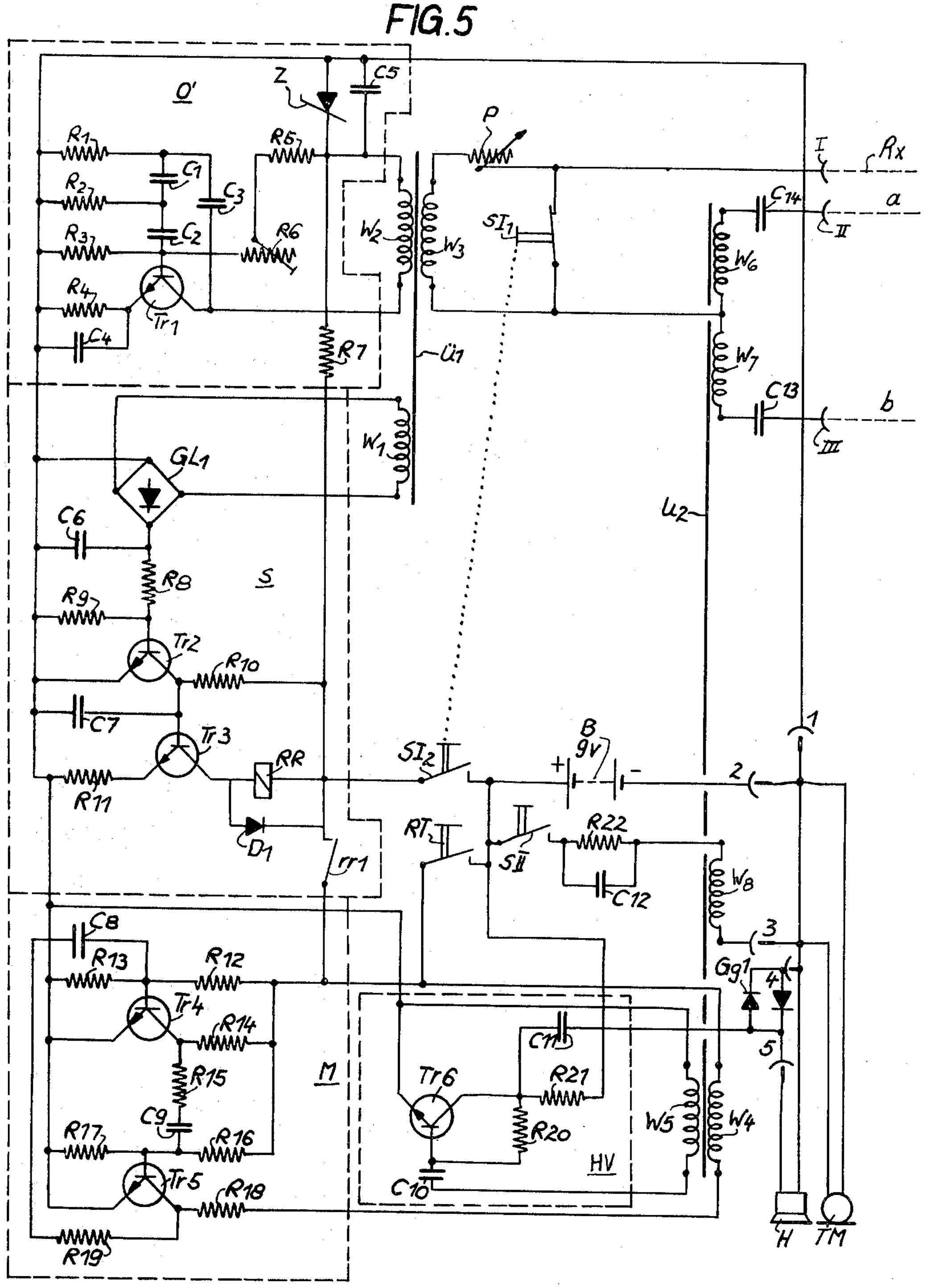
FIG. 5 is a circuit diagram of the generator side of still another embodiment of the testing device according to the present invention.

FIG. 5 shows a complete cable testing device according to the present invention with which tests can be made at the generator side as well as at the user side. One such device can be provided at each side. Generator and user side can also call one another, and talk and listen to each other. The oscillator O' includes resistors $R_1$, $R_2$, $R_3$, $R_4$, $R_5$ and $R_6$, capacitors $C_1$, $C_2$, $C_3$ and $C_4$, pnp transistor $Tr_1$ and winding $W_2$ of transformer $U_1$. In addition, a resistor $R_7$, a Zener diode Z and a capacitor $C_5$ are provided to stabilize the voltage supply to 7.5V, whereas the voltage of battery B is 9V. In the system represented by resistors $R_1$ $R_2$ as well as capacitors $C_1$ and $C_2$, the pnp transistor $Tr_1$ and the feedback capacitor $C_3$ produce an oscillation at a frequency of, for example, 185 ± 10 Hz.

Resistors $R_3$ to $R_6$ set the operating point of the transistor and its oscillation amplitude. Capacitor $C_4$ effects decoupling.

The switching stage S, consists of winding $W_1$ of transformer $U_1$, a rectifier $GL_1$ capactiors $C_6$ and $C_7$, resistors $R_8$, $R_9$, $R_{10}$ and $R_{11}$, pnp transistors T$r_2$ and T$r_3$, a reed relay composed of a coil RR and a movable contact $rr_1$, and diode D1.

As long as oscillator O' oscillates, an alternating voltage is induced in windng $W_1$ of transformer $U_1$ which, together with the current through rectifier $GL_1$ and resistors $R_8$ and $R_9$, makes transistor T$r_2$ fully conductive. Thus, the full negative voltage is present at the collector of T$r_2$ so that transistor T$r_3$ is blocked.

If, however, during coincidence in the test circuit, the oscillation of oscillator O' decreases or ceases altogether, transistor $Tr_2$ becomes less, or not at all, conductive and transistor T$r_3$ receives a positive potential at its base and becomes conductive. This excites reed relay RR-$rr_1$ and delivers a positive potential to multivibrator M via closed contact $rr_1$ so that the multivibrator oscillates and emits a signal which is radiated to the user location via winding $W_4$ of transformer $U_2$.

The test current circuit includes potentiometer P, winding $W_3$ of transformer $U_1$, a center tapped winding constituted by windings $W_6$ and $W_7$ of transformer $U_2$, capacitors $C_{13}$ and $C_{14}$, terminals II and III, a call or talk line, a second device (not shown) connected as a receiver, and the line to be tested, which is connected to terminal I.

Here, too, the operating point of oscillator O' is set so that with a total resistance of the talk line and the line to be tested of 2,000 ohms the oscillator is safely damped. An increase in resistance of about 10 ohms regenerates the oscillations to prevent the switching stage S from activating multivibrator M.

A switch $SI_1$, $SI_2$, is also provided which, during switching from the user to the generator sides of the device, connects the positive terminal of the battery B via contact $SI_2$ to the oscillator while contact $SI_1$ opens. It will be understood that contact $SI_1$ must be closed in the device at the user side.

To call the other side of the cable, a key RT must be depressed so that the circuit of the known multivibrator M is closed to permit multivibrator M to produce square wave oscillations which are transmitted through windings $W_4$, $W_6$ and $W_7$ of transformer $U_2$ and the connected lines Rx, a, b to the listening circuit at the other side of the cable.

The listening circuit includes a known listening amplifier HV which is connected directly to the negative terminal of battery B and which amplifies the talk signal passing through the phantom circuit and capacitively transmits it to the head-set H which is connected via plug-in connections 5 and 2. To protect the headset, a noise killer rectifier, G*gl*, is provided.

In order to talk, switch SII must be closed so that the positive terminal of battery B is connected via winding $W_8$ of transformer $U_2$ and plug-in connection 3 to a talk microphone TM which is connected to the negative terminal of battery B via plug-in connection 2.

A resistor $R_{22}$ and a capacitor $C_{12}$ are connected between winding $W_8$ of transformer $U_2$ and switch SII, resistance $R_{22}$ reducing the current feeding the microphone, while the alternating talk current which is generated by multivibrator M and superimposed on the battery current can flow to the positive terminal via capacitor $C_{12}$ without impediment. This RC combination is not required when the operating voltage of the microphone corresponds to the battery voltage.

The plug pins of the plug-in connections 1 and 2 are bridged in the plug carrying the pins so that the instrument is in operating condition only when the five-terminal plug-in connection 1–5 has been closed.

If very short long distance cable sections are to be tested in which the line resistance of the lines to be tested and the return line is only a few ohms, the addition of a resistor of preferably about 100 ohms can increase the total resistance to a value which lies above the resistance increase required to attenuate the oscillator O′.

All resistors $R_1$ to $R_{22}$ are ohmic resistors. In this way, a cable testing device is provided with which it is possible to dependably distinguish even occupied "*b*" conductors. Moreover, the device according to the present invention permits the testing of occupied "*a*" conductors for interruptions, mixups, short-circuits between conductors and short-circuits to ground, capacitors $C_{13}$ and $C_{14}$ preventing the ringing units in the central office from being actuated.

It will be understood that the above description of the present invention is susceptible to various modifications, changes and adaptations, and the same are intended to be comprehended within the meaning and range of equivalents of the appended claims.

I claim:

1. Circuitry for testing for the proper connection of an individual conductor in a telephone cable having a plurality of conductors by providing an indication of the relation between a preselected resistance value and the resistance value of a conductive test path which includes a test portion and a return conductive portion, the test circuit comprising in combination:

a. a first transformer having a primary winding and first and second secondary windings, said first secondary winding being connected across the conductive test path;

b. controllable oscillator means having an output connected to said primary winding of said first transformer so that the conductive test path is inductively coupled to the output of said oscillator means, said oscillator means being switchable between an inoperative state and an operative state in which it produces a test signal having a constant frequency lying below the lower listening threshold of the telephone system, said oscillator means including control means responsive to the resistance of the conductive test path for switching said oscillator means to its operative state so as to enable it to oscillate only when the resistance of the conductive test path is above the preselected value;

c. adjustable resistance means, connected in the conductive test path to be in series with said first secondary winding of said transformer and the individual conductor to be tested, for providing a resistance in the conductive test path of a value such that the total resistance of the conductive test path is approximately equal to the preselected resistance value when the test portion of the conductive test path consists of an individual operative conductor;

d. a signal generator coupled to the output of said oscillator means for providing an indication signal only when said oscillator means is in a selected one of its states; and e. switching means connected to said second secondary winding and responsive to the output from said oscillator means for controlling said signal generator.

2. A circuit as defined in claim 1 wherein said oscillator means oscillates at a frequency of approximately 185 Hz in its operative state.

3. A circuit as defined in claim 1 wherein said switching means interrupts the circuit of said signal generator when said oscillator means is oscillating.

4. A circuit as defined in claim 1 wherein said second secondary winding of said first transformer has a greater number of turns than said primary winding of said first transformer connected to said oscillator means.

5. A circuit as defined in claim 1 wherein said switching means constitutes a circuit arrangement which causes said signal generator to be switched off when said oscillator means is oscillating and switched on when said oscillator means is inoperative.

6. A circuit as defined in claim 1 wherein said oscillator means is a feedback transistor oscillator operating according to the phase shift principle and includes a transistor producing oscillations at a frequency which lies below the lower listening threshold of the telephone system and resistance means for setting the operating point and oscillating amplitude of said transistor.

7. A circuit as defined in claim 1 further comprising a second transformer having a primary winding and two series connected secondary windings, a first earphone headset and a second earphone headset, and wherein said signal generator is a summing device whose output is connected to said primary winding of said second transformer, said first headset is connected to said primary winding of said second transformer and in parallel with said summing device, the return conductive portion is constituted by a free pair of conductors symmetrically connected to said secondary windings of said second transformer, said first secondary winding of said first transformer is connected to the return conductive path at a point of symmetry of the circuit formed by the free pair of conductors and said two series connected secondary windings of said second transformer and said second headset is connected in the conductive test path, at a side remote from said oscillator means, between the individual conductor to be tested and a point of symmetry of the circuit formed by the free pair of conductors and said two series connected secondary windings of said second transformer.

8. A circuit as defined in claim 7 further comprising capacitors each connected in series with a respective one of the conductors of the free pair of conductors of the return conductive portion.

9. A circuit as defined in claim 7 wherein said summing device is a multivibrator.

10. A circuit as defined in claim 7 further comprising capacitors connected to both ends of the individual conductor to be tested and in series therewith to protect the device against extraneous voltages.

11. A circuit as defined in claim 7 wherein said oscillator means includes a resistor, a Zener diode, and a capacitor connected to stabilize a voltage supply connected to said oscillator means.

12. A circuit as defined in claim 7 further comprising: a telephone set consisting of a microphone and a headset connected to said multivibrator, a first switch connected to open and close the microphone circuit, a second switch connected to open and close the ringing circuit and a third switch connected to switch the test circuit on and off.

13. A circuit as defined in claim 12 further comprising a fourth switch associated with said third switch to function as a terminal switch for simultaneously turning off the test circuit with its one terminal and through its other terminal short-circuiting the individual conductor to be tested with the center tap of the symmetrically connected free conductors.

14. A circuit as defined in claim 12 wherein said microphone circuit includes a resistor connected to protect said microphone against excess currents.

15. A circuit as defined in claim 12 further comprising a listening amplifier associated with said headset.

16. A circuit as defined in claim 12 further comprising a noise killer rectifier associated with said headset.

17. A circuit as defined in claim 1 wherein said signal generator is a radio signal generator and further comprising a radio signal receiver connected to receive the signal from said radio signal generator and disposed at the other ends of the conductive test path being tested.

* * * * *